(12) United States Patent
Ezrielev et al.

(10) Patent No.: US 12,412,108 B2
(45) Date of Patent: Sep. 9, 2025

(54) SYSTEM AND METHOD FOR INFERENCE GENERATION VIA OPTIMIZATION OF INFERENCE MODEL PORTIONS

(71) Applicant: Dell Products L.P., Round Rock, TX (US)

(72) Inventors: Ofir Ezrielev, Beer Sheva (IL); Avitan Gefen, Tel Aviv (IL); Nadav Azaria, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 622 days.

(21) Appl. No.: 17/862,920

(22) Filed: Jul. 12, 2022

(65) Prior Publication Data

US 2024/0020550 A1    Jan. 18, 2024

(51) Int. Cl.
*G06N 5/04*    (2023.01)

(52) U.S. Cl.
CPC ..................................... *G06N 5/04* (2013.01)

(58) Field of Classification Search
CPC ........... G06N 5/04; G06N 3/063; G06N 3/045
See application file for complete search history.

(56) References Cited

U.S. PATENT DOCUMENTS

| | | | |
|---|---|---|---|
| 10,540,202 B1 * | 1/2020 | Smaldone | G06F 9/5027 |
| 12,242,928 B1 * | 3/2025 | Chen | G06N 5/01 |
| 2019/0182055 A1 * | 6/2019 | Christidis | G06Q 10/06312 |
| 2020/0019393 A1 | 1/2020 | Vichare et al. | |
| 2021/0117859 A1 | 4/2021 | Rogers et al. | |
| 2022/0383149 A1 | 12/2022 | Cao et al. | |
| 2023/0090941 A1 * | 3/2023 | Li | G06V 20/40 382/157 |
| 2024/0020510 A1 * | 1/2024 | Ezrielev | G06N 3/063 |

(Continued)

OTHER PUBLICATIONS

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057. short.

(Continued)

*Primary Examiner* — Maher N Algibhah
(74) *Attorney, Agent, or Firm* — WOMBLE BOND DICKINSON (US) LLP

(57) ABSTRACT

Methods and systems for inference generation are disclosed. To manage inference generation, a system may include an inference model manager and any number of data processing systems. The inference model manager may represent an inference model as a bipartite graph. To obtain portions of the inference model, the bipartite graph may be partitioned into portions and the portions may undergo an optimization process. The optimization process may include adding and/or competing for nodes of the bipartite graph in order to increase the stability of the portion with respect to the available computing resources of a corresponding data processing system. The optimization process may continue until all portions achieve stability in a way that reduces necessary communications between the data processing systems. Each portion of the inference model may be distributed to one data processing system so that the data processing systems may collectively generate inferences usable by a downstream consumer.

20 Claims, 17 Drawing Sheets

(56) References Cited

U.S. PATENT DOCUMENTS

2024/0020550 A1* 1/2024 Ezrielev ............... G06N 5/04
2024/0177028 A1* 5/2024 Ezrielev ............... G06N 20/00
2024/0220831 A1* 7/2024 Wyman ............... G06N 20/00

OTHER PUBLICATIONS

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssm.com/sol3/papers.cfm?abstract_id=3529843.

Gholami, Amir, et al. "A survey of quantization methods for efficient neural network inference." arXiv preprint arXiv:2103.13630 (2021). https://arxiv.org/abs/2103.13630.

Blalock, Davis, et al. "What is the state of neural network pruning?." Proceedings of machine learning and systems 2 (2020): 129-146. https://proceedings.mlsys.org/book/296.pdf.

* cited by examiner

SYSTEM AND METHOD FOR INFERENCE GENERATION VIA OPTIMIZATION OF INFERENCE MODEL PORTIONS

FIELD

Embodiments disclosed herein relate generally to inference generation. More particularly, embodiments disclosed herein relate to systems and methods to generate inferences across multiple data processing systems throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements

DETAILED DESCRIPTION

Figure 1:
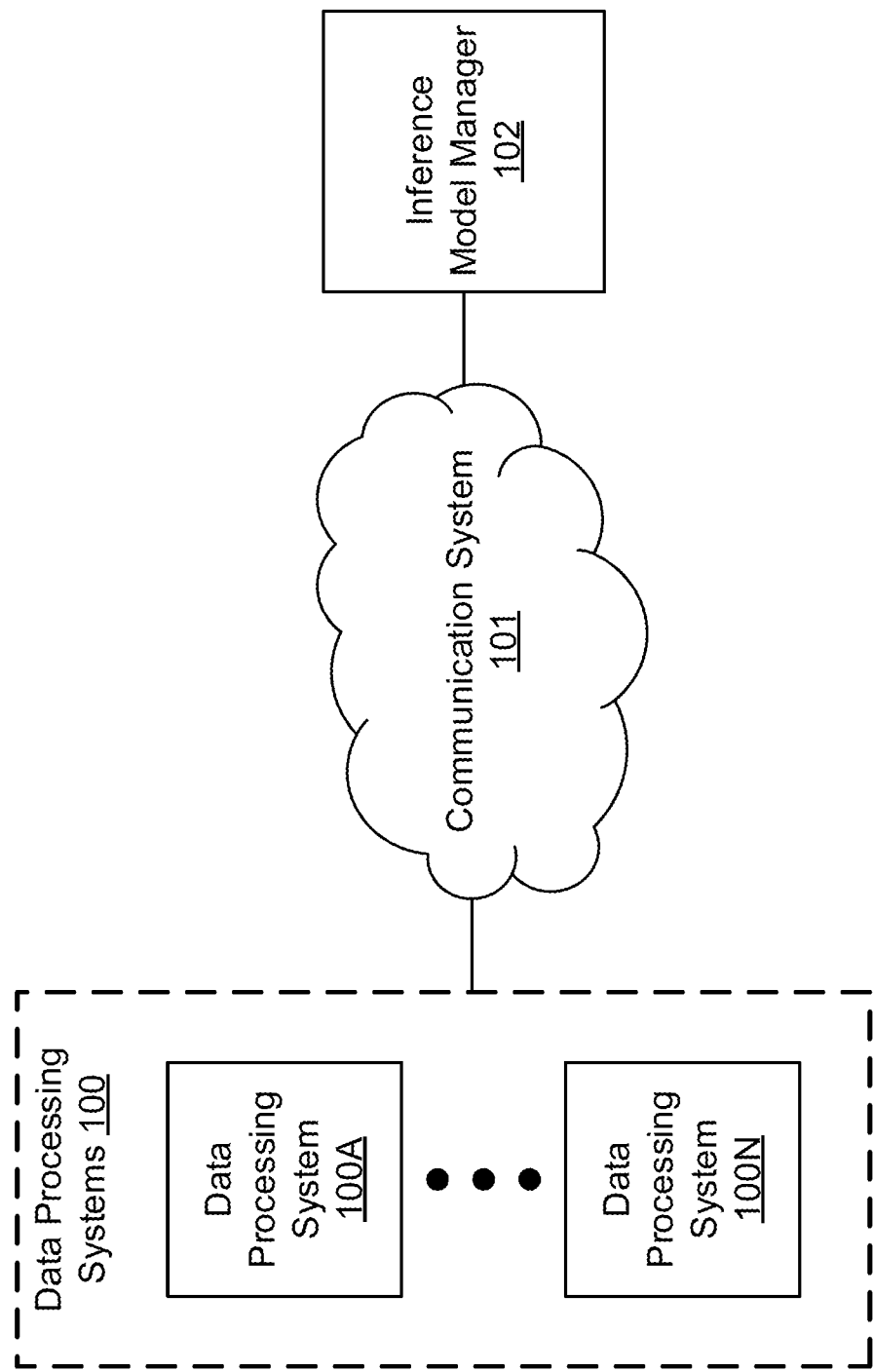
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for inference generation throughout a distributed environment. To manage inference generation, the system may include an inference model manager and any number of data processing systems. Hosting and executing an inference model by one data processing system may consume undesirable quantities of computing resources and increase computational overhead throughout a distributed environment.

In order to reduce computing resource consumption, the inference model manager may partition the inference model into portions and distribute the portions across multiple data processing systems. The data processing systems may perform other functions within a distributed environment and may have computing resources available to host and execute portions of an inference model. However, transmissions between the data processing systems while executing the inference model may consume excess communication system bandwidth. Therefore, the inference model manager may partition the inference model to reduce communications between data processing systems during execution of the inference model portions defined by the partitioning.

In order to obtain portions of the inference model, the inference model manager may represent the inference model as a bipartite graph. The inference model may be a trained neural network inference model and the bipartite graph may indicate relationships between neurons of the neural network inference model. A first set of elements (e.g., nodes) of the bipartite graph may include any parameters of the neural network inference model (e.g., weights, biases, etc.). A second set of elements of the bipartite graph may include the values of the neurons of the neural network inference model. The bipartite graph may include edges connecting each node to one or more parameters associated with that node.

A portion of the bipartite graph may be selected by grouping nodes that share parameters and, therefore, may depend on values of other nodes in the portion. In order to do so, a first node may be randomly assigned to an initial portion of the bipartite graph. Other nodes may be added to the initial portion to obtain a revised portion of the bipartite graph by performing a breadth-first search of the bipartite graph. The breadth-first search may identify nodes that share data dependencies with the first node. This process may continue until the revised portion reaches (or approaches) a stability limit. The stability limit may be based on the quantity of computing resources (e.g., processing, memory, storage, etc.) available to a given data processing system. If the revised portion exceeds the stability limit, the revised portion may split into a set of two stable revised portions.

The revised portions of the bipartite graph may undergo an optimization process in which the revised portions attempt to capture nodes belonging to other revised portions in order to increase their stability and reduce edges between the revised portions. The optimization process may end when all revised portions of the bipartite graph achieve stability and edges between the revised portions are reduced (and/or for other reasons). Portions of the inference model may be obtained based on the revised portions of the bipartite graph.

The inference model manager may distribute the portions of the inference model to data processing systems in accordance with an execution plan, the execution plan facilitating timely execution of the inference model with respect to the needs of a downstream consumer. By doing so, inferences may be provided to the downstream consumer while conserving computing resources and communication system bandwidth throughout a distributed environment.

Thus, embodiments disclosed herein may more efficiently marshal limited computing resources for the generation of inferences that may be used to drive subsequent processes. By improving the efficiency of inference generation, a system in accordance with embodiments disclosed herein may perform other desired functions thereby improving system throughput without increasing cost through addition of hardware resources. The disclosed embodiments may be broadly applicable to many systems include, for example, autonomous device (or groups thereof), edge compute, manufacturing environment, and/or other systems.

In an embodiment, a method for executing an inference model across multiple data processing systems that each individually have insufficient computing resources to complete timely execution of the inference model is provided.

The method may include: identifying available computing resources of each of the data processing systems; dividing the inference models into portions based on: characteristics of units of the inference model that indicate data dependencies between the units of the inference model, and an optimization process that groups the units into the portions of the inference model based on a likelihood of potential groups of the units exceeding the available computing resources of corresponding data processing systems; distributing the portions of the inference model to the data processing systems; and executing the inference model using the portions of the inference model distributed to the data processing systems to obtain an inference model result.

The units of the inference model may be neurons of a trained neural network.

The data dependencies between the units of the inference model may include weights for the corresponding neurons.

The method may also include obtaining a bipartite graph representation of the inference model.

A first group of nodes of the bipartite graph representation may correspond to neurons of a trained neural network and a second group of the nodes of the bipartite graph representation may correspond to the data dependencies between the neurons of the trained neural network.

Performing the optimization process may include: obtaining initial portions of the bipartite graph, with each of the initial portions comprising a node of the bipartite graph corresponding to a unit of the trained neural network; optimizing the initial portions of the bipartite graph to obtain revised portions of the bipartite graph; and adding units of the trained neural network to the portions of the inference model based on the revised portions of the bipartite graph.

The initial portions of the bipartite graph may be obtained by randomly assigning a node from the bipartite graph to each respective portion of the portions of the bipartite graph.

Optimizing the initial portions of the bipartite graph may include: for a portion of the portions of the bipartite graph: performing a breadth-first search to identify a neighboring node of the bipartite graph with respect to a last added node of the portion; adding the neighboring node to the portion to obtain a revised portion; making a determination regarding whether the revised portion is unstable; in an instance where the determination indicates that the portion is unstable: dividing the revised portion into two portions to obtain a set of stable portions; and in an instance where the determination indicates that the portion is stable: retaining the revised portion to obtain the set of stable portions.

Optimizing the initial portions of the bipartite graph further may include: revising the set of stable portions based on a competitive process that removes nodes from portions of the set of stable portions that are closer to a stability limit and adding the removed nodes to other portions of the set of stable portions that are further away from the stability limit.

The neighboring node has a data dependency with respect to the last added node.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing an inference model across multiple data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by an inference model executed across multiple data processing systems throughout a distributed environment.

For example, inference model manager 102 may be used as part of a quality control system in which inferences generated using an inference model are used to make quality control decisions regarding a product. An inference model may be executed across multiple data processing systems which collectively may generate the inferences. In an industrial environment, for example, inference model manager 102 may distribute portions of an inference model to a variety of data processing systems (e.g., devices with available computing resources such as temperature sensors, assembly line controllers, etc.) which may collectively generate an inference regarding the success or failure of a product to meet quality control standards. Inference model manager 102 may be utilized in other types of environments without departing from embodiments disclosed herein.

To facilitate execution of inference models across multiple data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of inference models.

For example, all, or a portion, of the data processing systems 100 may provide computer-implemented services to users and/or other computing devices operably connected to data processing systems 100. The computer-implemented services may include any type and quantity of services including, for example, generation of a partial or complete processing result using a portion of an inference model. Different data processing systems may provide similar and/or different computer-implemented services.

Inferences generated by inference models may be utilized in order to provide computer-implemented services to downstream consumers of the services. However, the quality of the computer-implemented services may be dependent on the accuracy of the inferences and, therefore, the complexity of the inference model. An inference model capable of generating accurate inferences may consume an undesirable quantity of computing resources during operation. The addition of a data processing system dedicated to hosting and operating the inference model may increase communication bandwidth consumption, power consumption, and/or computational overhead throughout the distributed environment.

In general, embodiments disclosed herein may provide methods, systems, and/or devices for executing an inference model across multiple data processing systems that each individually have insufficient computing resources to complete timely execution of the inference model. To execute an inference model across multiple data processing systems, a system in accordance with an embodiment may partition an inference model into portions, each portion being distributed to a data processing system capable of hosting and operating the portion of the inference model. The inference model may be partitioned in order to reduce inter-data processing system communications, thereby distributing the computing resource load amongst the data processing systems and conserving communication system bandwidth throughout the distributed environment.

To provide its functionality, inference model manager 102 may (i) obtain portions of an inference model, (ii) distribute the portions of the inference model to data processing systems 100, and/or (iii) execute the inference model using the portions of the inference model to obtain an inference model result.

To obtain portions of an inference model, inference model manager 102 may generate (or otherwise obtain) an inference model. The inference model may be a neural network inference model and inference model manager 102 may represent the neural network inference model as a bipartite graph. The bipartite graph may indicate neural network parameters (e.g., weights, biases, etc.) associated with each neuron of the neural network inference model. The bipartite graph may include a first set of elements (e.g., nodes) based on parameters of the neural network inference model (e.g., weights, biases, etc.). The bipartite graph may also include a second set of elements based on values of neurons of the neural network inference model. The first set of elements and the second set of elements may be connected by edges on the bipartite graph to indicate which parameters may be associated with each neuron. For an example of a neural network inference model and an associated bipartite graph, refer to FIGS. 4C-4J. While described above with respect to a neural network inference model, other types of inference models may be utilized without departing from embodiments disclosed herein.

Inference model manager 102 may partition the inference model into portions using the bipartite graph. Each portion of the inference model may be distributed to one data processing system and, therefore, the quantity of portions may be based on the quantity of data processing systems. In addition, each portion of the inference model may depend on the quantity of computing resources available to each data processing system. Available computing resources of a data processing system may be based on a quantity of available storage of the data processing system, a quantity of available memory of the data processing system, a quantity of available communication bandwidth between the data processing system and other data processing systems, and/or a quantity of available processing resources of the data processing system.

In order to reduce communication bandwidth consumption during execution of the inference model, portions of the bipartite graph may be selected and optimized in order to reduce edges between the portions of the bipartite graph. By reducing edges between portions of the bipartite graph, nodes that depend on the same (and/or related) parameters may be included in one portion of the inference model thereby reducing the frequency of transmissions between data processing systems during execution of the inference model and the quantity of data processing systems involved in the execution of the inference model. Reducing the quantity of data processing systems involved in the execution of the inference model may conserve computational resource expenditure throughout the distributed environment. By doing so, overall energy consumption may also be reduced throughout the distributed environment. Refer to FIG. 3B for additional details regarding partitioning of inference models.

Inference model manager 102 may utilize the portions of the inference model to obtain an execution plan, the execution plan including instructions for distribution and timely execution of the inference model. The execution plan may be based on the portions of the inference model and the needs of a downstream consumer of the inferences generated by the inference model.

In an embodiment, inference model manager 102 may distribute the portions of the inference model to the data processing systems such that one portion of the inference model may be distributed to each data processing system in accordance with the execution plan. By doing so, the data processing systems may collectively execute the inference model to obtain an inference model result.

In an embodiment, inference model manager 102 may execute the inference model using the portions of the inference model distributed to the data processing systems and the execution plan in order to obtain an inference model result. Executing the inference model may include distributing the execution plan to the data processing systems, obtaining an inference model result from the data processing systems, and/or providing the inference model result to a downstream consumer of the inference model result.

Figure 3A:
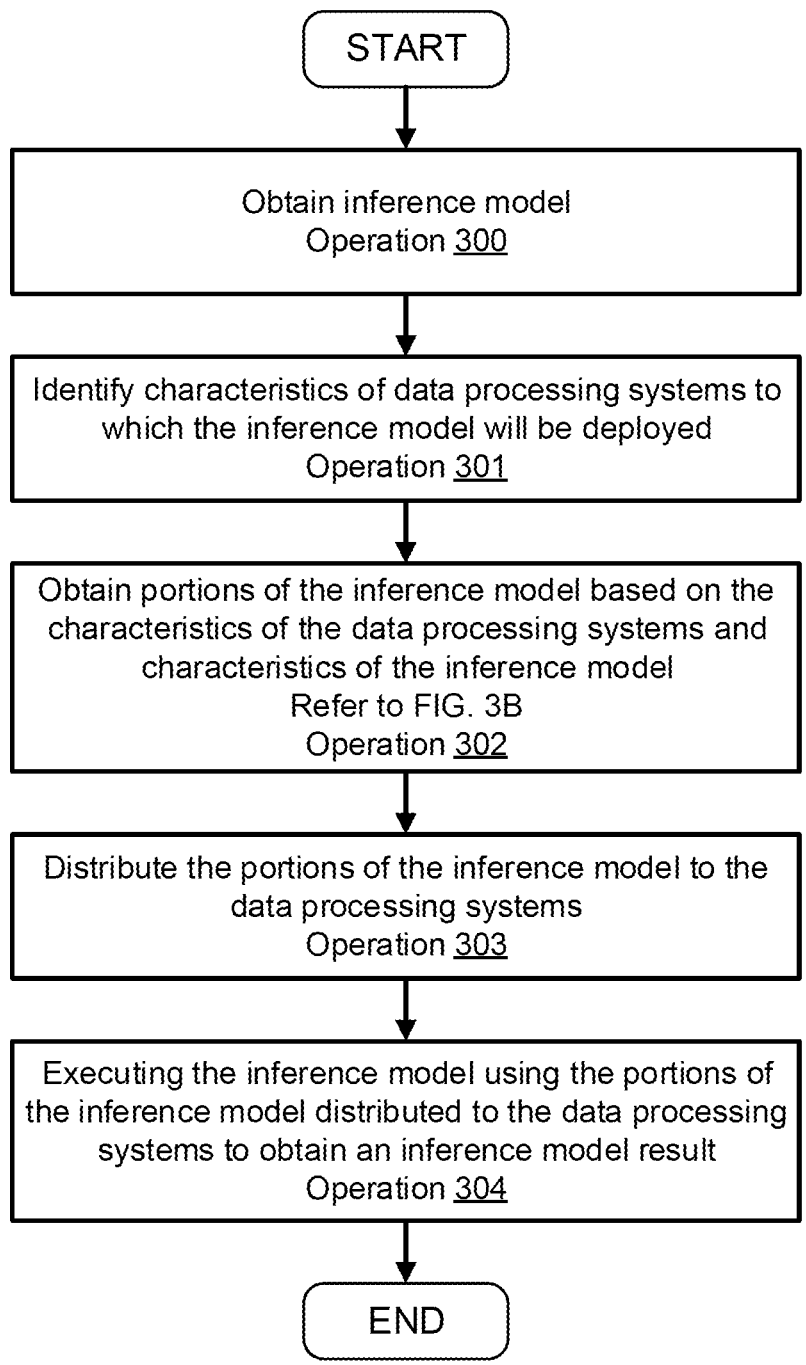
FIG. 3A shows a flow diagram illustrating a method of executing an inference model across multiple data processing systems throughout a distributed environment in accordance with an embodiment.
Figure 3B:
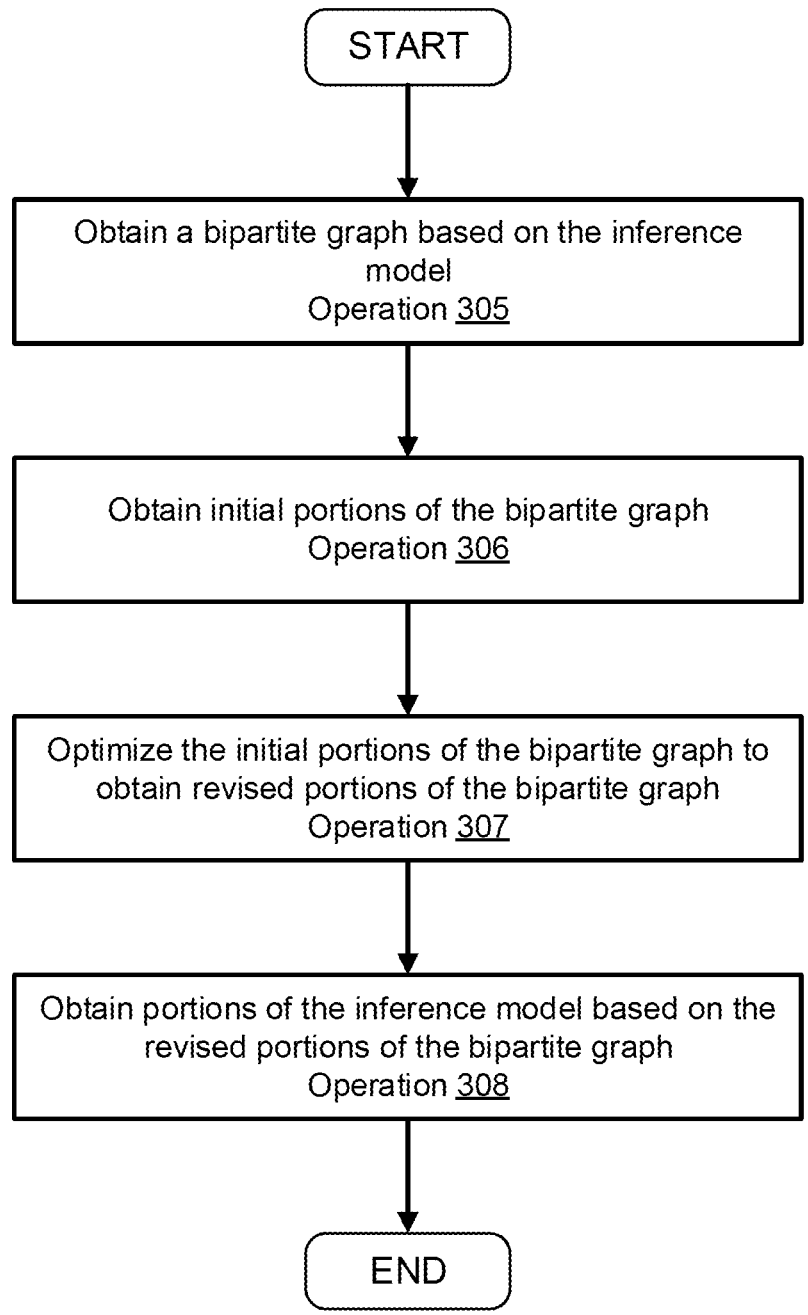
FIG. 3B shows a flow diagram illustrating a method of obtaining portions of an inference model in accordance with an embodiment.
Figure 3C:
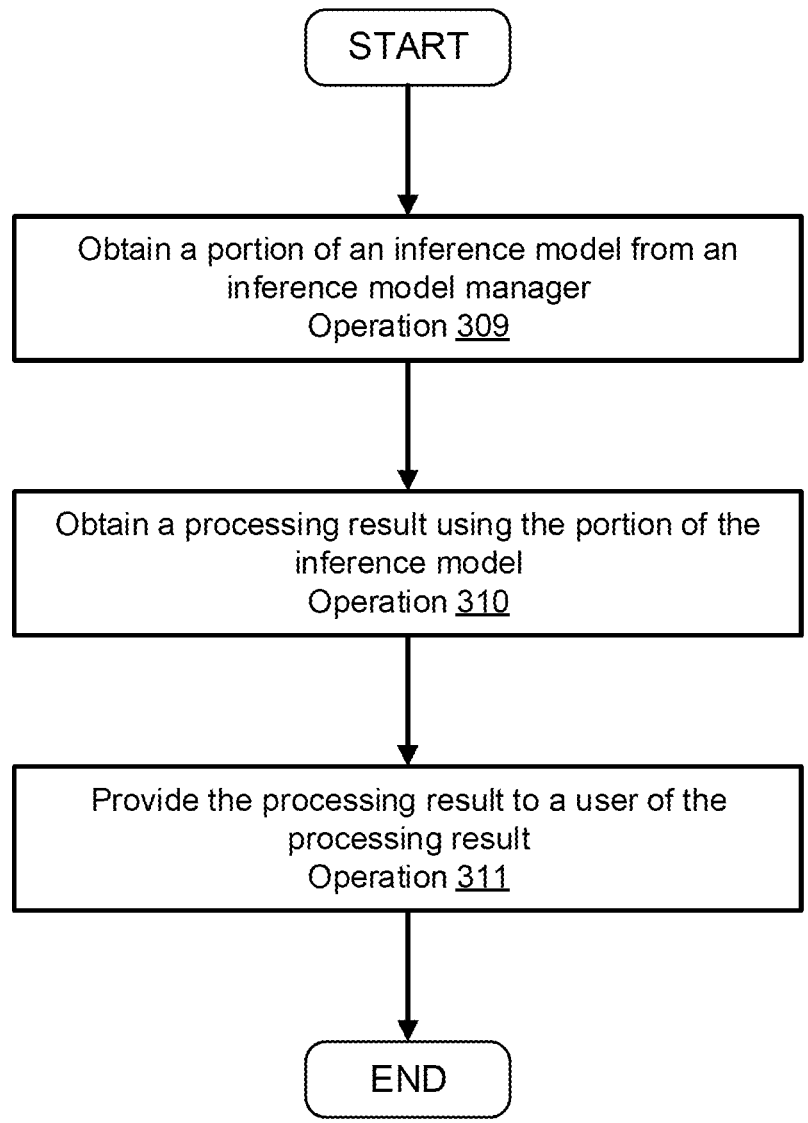
FIG. 3C shows a flow diagram illustrating a method of obtaining a processing result using a portion of an inference model in accordance with an embodiment.

When performing its functionality, inference model manager 102 may perform all, or a portion, of the methods and/or actions shown in FIGS. 3A-3C.

To provide their functionality, data processing systems 100 may (i) obtain portions of an inference model, (ii) obtain a processing result using the portions of the inference model, and/or (iii) provide the processing result to a user of the processing result.

When performing their functionality, data processing systems 100 may perform all, or a portion, of the methods and/or actions shown in FIGS. 3A-3C.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 are implemented using an internet of things (IoT) device, which may include a computing device. The IoT device may operate in accordance with a communication model and/or management model known to the inference model manager 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
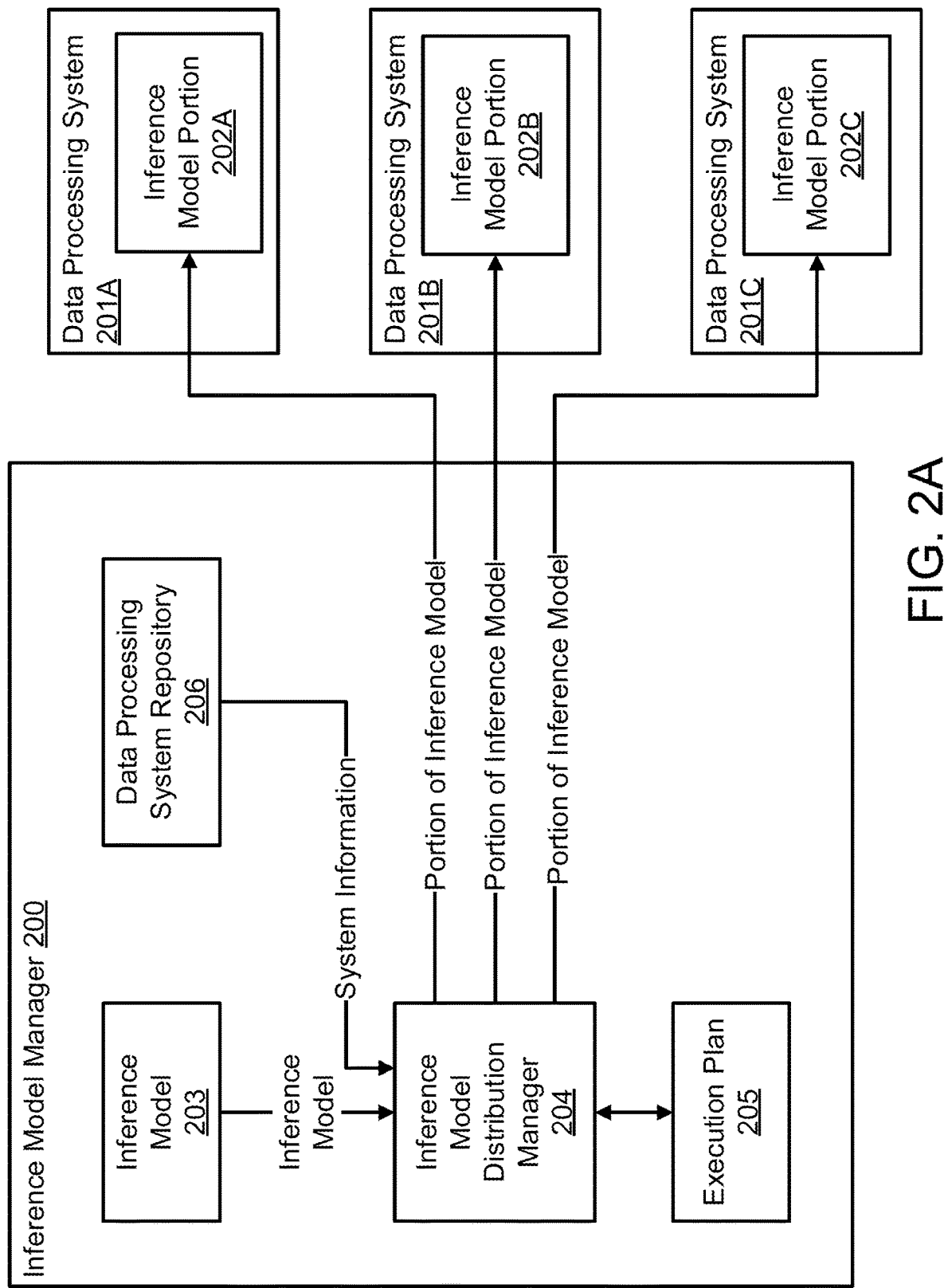
FIG. 2A shows a block diagram illustrating an inference model manager and multiple data processing systems over time in accordance with an embodiment.
Figure 2B:
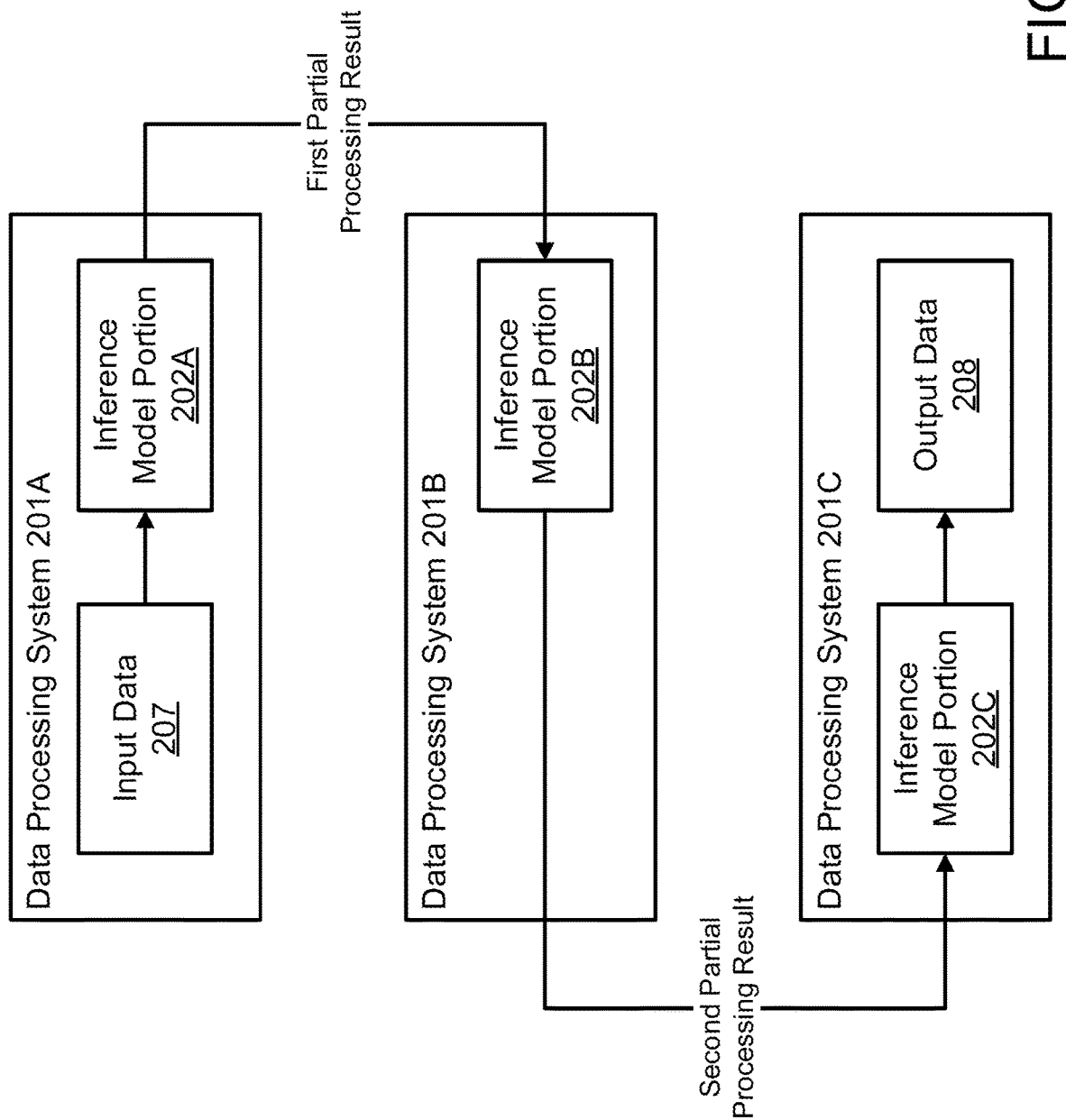
FIG. 2B shows a block diagram illustrating multiple data processing systems over time in accordance with an embodiment.

To further clarify embodiments disclosed herein, diagrams of a system over time in accordance with an embodiment are shown in FIGS. 2A-2B.

Turning to FIG. 2A, a diagram of inference model manager 200 and data processing systems 201A-201C is shown. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing an inference model across multiple data processing systems that each individually have insufficient computing resources to complete timely execution of the inference model. The computing resources of the individual data processing systems may be insufficient due to: insufficient available storage to host the inference model and/or insufficient processing capability for timely execution of the inference model.

In order to execute the inference model across multiple data processing systems, inference model manager 200 may obtain portions of an inference model and may distribute the portions of the inference model to data processing systems 201A-201C. The portions may be based on: (i) the computing resource availability of the data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

In order to obtain portions of the inference model, inference model manager 200 may host an inference model distribution manager 204. Inference model distribution manager 204 may (i) obtain an inference model, (ii) identify characteristics of data processing systems to which the inference model may be deployed, (iii) obtain portions of the inference model based on the characteristics of the data processing systems and characteristics of the inference model, (iv) distribute the portions of the inference model to the data processing systems, and/or (v) execute the inference model using the portions of the inference model distributed to the data processing systems to obtain an inference model result.

Inference model manager 200 may obtain inference model 203. Inference model 203 may be a neural network inference model including an input layer of neurons, any number of hidden layers of neurons, and an output layer of neurons. Inference model manager 200 may obtain characteristics of the inference model 203. Characteristics of the inference model 203 may include a quantity of layers included in the inference model 203 and a quantity of relationships between the layers of the inference model 203. The characteristics of the inference model may indicate data dependencies of the inference model and the data dependencies may be based on the relationships between neurons. For example, data dependencies may be parameters such as weights, biases, etc.

In order to determine data dependencies of the inference model 203, inference model distribution manager may represent inference model 203 as a bipartite graph. The bipartite graph may include a first set of elements (e.g., nodes) based on parameters of the neural network inference model (e.g., weights of the neural network inference model, biases of the neural network inference model, and/or other parameters). The bipartite graph may include a second set of elements based on values of the neurons in the neural network inference model. The bipartite graph may also include edges between the first set of elements and the second set of elements, the edges representing data dependencies of the neurons and, therefore, communications necessary for execution of the inference model (assuming each neuron is hosted by a separate data processing system). By determining data dependencies, the bipartite may be partitioned in order to reduce transmissions between portions of the inference model during execution of the inference model. While described above with respect to a neural network inference model, other types of inference models may be utilized without departing from embodiments disclosed herein. Refer to FIG. 3B for additional details regarding obtaining and optimizing portions of the inference model.

Each portion of the inference model may be distributed to one data processing system throughout a distributed environment. Therefore, prior to determining the portions of the inference model, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems. Therefore, the inference model distribution manager 204 may obtain a first portion of the inference model (e.g., inference model portion 202A) based on the system information (e.g., the available computing resources) associated with data processing system 201A and based on the data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing the inference model portions 202A-202C, inference model distribution manager 204 may utilize the inference model portions 202A-202C to obtain execution plan 205. Execution plan 205 may include instructions for timely execution of the inference model using the portions of the inference model and based on the needs of a downstream consumer of the inferences generated by the inference model.

Inference model manager 200 may distribute inference model portion 202A to data processing system 201A, inference model portion 202B to data processing system 201B, and inference model portion 202C to data processing system 201C. Inference model portions 202A-202C may each include one or more neurons of a neural network inference model. Data processing systems 201A-201C may collectively execute the inference model 203 to generate an inference model result (e.g., one or more inferences). The inference model result may be usable by a downstream consumer in order to perform a task, make a control decision, and/or perform any other action set. While shown in FIG. 2A as distributing three portions of the inference model to three data processing systems, the inference model may be partitioned into any number of portions and distributed to any number of data processing systems throughout a distributed environment.

Turning to FIG. 2B, data processing systems 201A-201C may execute the inference model. In order to do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A in order to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B in order to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C in order to obtain output data 208. Output data 208 may include inferences collectively generated by the portions of the inference model distributed across data processing systems 201A-201C. The transmission of partial processing results between the data processing systems and the input taken by the data processing systems may have the appearance of a graph similar to that derived using the bipartite graph.

Output data 208 may be utilized by a downstream consumer of the data in order to perform a task, make a decision, and/or perform any other action set that may rely on the inferences generated by the inference model. For example, output data 208 may include a quality control determination regarding a product manufactured in an industrial environment. The output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

By executing the inference model across multiple data processing systems, computing resource expenditure throughout the distributed environment may be reduced. In addition, by partitioning the inference model in order to reduce communications between data processing systems, communication network bandwidth may also be conserved throughout the distributed environment.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to execute an inference model throughout a distributed environment. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of executing an inference model across multiple data processing systems throughout a distributed environment is shown.

At operation 300, an inference model is obtained. The inference model may be implemented with, for example, a neural network inference model. The inference model may generate inferences that may be usable to downstream consumers.

In an embodiment, the inference model may be obtained by the inference model manager 102 using a training data set. The training data set may be fed into a neural network inference model (and/or any other type of inference generation model) to obtain the inference model. The inference model may also be obtained from another entity through a communication system. For example, an inference model may be obtained by another entity through training a neural network inference model and providing the trained neural network inference model to the inference model manager 102.

At operation 301, characteristics of data processing systems to which the inference model may be deployed are identified. Characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems. The characteristics of the data processing systems may be utilized by inference model manager 102 in order to obtain portions of an inference model as described below. The characteristics of the data processing systems may be provided to the inference model manager 102 from the data processing systems, and/or from any other entity throughout the distributed environment.

At operation 302, portions of the inference model are obtained based on the characteristics of the data processing systems and characteristics of the inference model. In order to obtain the portions of the inference model, inference model manager 102 may represent the neural network inference model as a bipartite graph, the bipartite graph indicating data dependencies between neurons in the neural network inference model. Refer to FIGS. 4C-4J for an example of a neural network inference model and corresponding bipartite graph. Refer to FIG. 3B for additional information regarding obtaining portions of the inference model.

In an embodiment, portions of the inference model may be obtained by another entity through obtaining the inference model and representing the inference model as a bipartite graph. The other entity may transmit the portions of the inference model (and/or instructions for obtaining the portions of the inference model) to the inference model manager 102.

At operation 303, the portions of the inference model are distributed to the data processing systems. The portions of the inference model may be distributed to data processing systems in a manner that reduces communications between data processing systems during execution of the inference model and utilizes the available computing resources of each data processing system. One portion of the portions of the inference model may be distributed to each data processing system of the data processing systems. Portions of the inference model may be distributed in accordance with an execution plan. The execution plan may include: (i) instructions for obtaining portions of the inference model, (ii) instructions for distribution of the inference model, (iii) instructions for execution of the inference model, and/or other instructions. The execution plan may be obtained in order to facilitate timely execution of the inference model in accordance with the needs of a downstream consumer of the inferences generated by the inference model. The execution plan may be generated by the inference model manager 102 and/or obtained from another entity throughout the distributed environment.

At operation 304, the inference model is executed using the portions of the inference model distributed to the data processing systems to obtain an inference model result. The inference model may be executed in accordance with the execution plan. The inference model manager 102 may execute the inference model by sending instructions and/or commands to the data processing systems 100 to initiate the execution of the inference model.

In an embodiment, the inference model may be executed using input data. The input data may be obtained by the inference model manager 102, any of data processing systems 100 and/or another entity. Inference model manager 102 may obtain the input data and transmit the input data to a first data processing system of the data processing systems 100 along with instructions for timely executing the inference model based on the input data. The instructions for timely execution of the inference model may be based on the needs of a downstream consumer with respect to the inferences generated by the inference model.

The operation may end following operation 304.

Turning to FIG. 3B, a flow diagram illustrating a method of obtaining portions of an inference model in accordance with an embodiment is shown. The operations in FIG. 3B may be an expansion of operation 302 in FIG. 3A.

At operation 305, a bipartite graph is obtained based on the inference model. The bipartite graph may include a first set of elements (e.g., nodes) based on parameters of the neural network inference model (e.g., weights of the neural network inference model, biases of the neural network inference model, and/or other parameters). The bipartite graph may include a second set of elements based on values of the neurons in the neural network inference model. In addition, the bipartite graph may include edges between the first set of elements and the second set of elements, the edges indicating associations between the neurons and the parameters. Refer to FIGS. 4C-4J for an example of a neural network and a corresponding bipartite graph.

In an embodiment, inference model manager 102 may obtain the bipartite graph by generating the bipartite graph. In another embodiment, inference model manager 102 may obtain the bipartite graph from another entity responsible for generating the bipartite graph based on the inference model.

At operation 306, initial portions of the bipartite graph are obtained. The initial portions of the bipartite graph may be obtained by randomly assigning a node corresponding to a unit of the trained neural network inference model from the bipartite graph to each respective portion of the portions of the bipartite graph. For example, the inference model manager 102 may generate two initial portions of the inference model and may randomly assign one node from the bipartite graph (corresponding to a unit of the neural network inference model) to each of the two initial portions of the inference model.

In an embodiment, the initial portions of the bipartite graph are generated by the inference model manager 102. In another embodiment, the initial portions of the bipartite graph are generated by another entity and transmitted to inference model manager 102 for optimization.

At operation 307, the initial portions of the bipartite graph are optimized to obtain revised portions of the bipartite graph. Optimizing the initial portions of the bipartite graph may include grouping the units of the bipartite graph into the portions of the inference model based on the likelihood of potential groups of the units exceeding the available computing resources of corresponding data processing systems. In addition, inference model manager 102 may partition the bipartite graph into portions that reduce the edges between the portions. By doing so, nodes that share data dependencies may be included in the same portion and, therefore, hosted by the same data processing system. By grouping the nodes that share data dependencies, excess communications between data processing systems may be avoided. Consequently, overall communication bandwidth consumption may be conserved throughout the distributed environment.

In an embodiment, optimization of the initial portions of the bipartite graph may include performing a breadth-first search to identify a neighboring node of the bipartite graph with respect to a last added node of the portion and adding the neighboring node to the portion to obtain a revised portion. The neighboring node may have a data dependency with respect to the last added node. Inference model manager 102 may make a determination regarding the stability of the revised portion. In an instance where the determination indicates that the portion may be unstable, the revised portion may be divided into two portions to obtain a set of stable portions. In an instance where the determination indicates that the portion may be stable, the revised portion may be retained. Inference model manager 102 may continue to add neighboring nodes to the revised portions of the bipartite graph until all nodes of the bipartite graph belong to one of the revised portions and all of the revised portions meet stability requirements.

Following the generation of the revised portions of the bipartite graph, inference model manager 102 may further optimize the set of stable portions based on a competitive process. The competitive process may remove nodes from portions of the set of stable portions that are closer to a stability limit and adding the removed nodes to other portions of the set of stable portions that are further away from the stability limit. This process may continue until all revised portions meet stability requirements and match computing resource availability of corresponding data processing systems. By grouping nodes that share data dependencies, excess communications between data processing systems may be avoided. Consequently, overall communication bandwidth consumption may be conserved throughout the distributed environment.

In an embodiment, the initial portions of the bipartite graph may be optimized by inference model manager 102. In another embodiment, the initial portions of the bipartite graph may be obtained and optimized by another entity prior to transmitting the optimized (e.g., revised) portions of the bipartite graph to inference model manager 102.

At operation 308, portions of the inference model are obtained based on the revised portions of the bipartite graph. Each revised portion of the bipartite graph may correspond to one portion of the inference model and each portion of the inference model may be intended for distribution to a unique data processing system throughout the distributed environment. In an embodiment, portions of the inference model may be obtained by the inference model manager 102. In another embodiment, portions of the inference model may be obtained by another entity and transmitted to inference model manager 102 for distribution to data processing systems 100. In another embodiment, an entity throughout the distributed environment may transmit instructions for obtaining portions of the inference model to inference model manager 102 and inference model manager 102 may implement the instructions.

The method may end following operation 308.

Turning to FIG. 3C, a flow diagram illustrating a method of obtaining a processing result using a portion of an inference model in accordance with an embodiment is shown.

At operation 309, a portion of an inference model is obtained from an inference model manager. The portion of the inference model may utilize the computing resources available to a data processing system (e.g., data processing system 100A). For example, data processing system 100A may be a temperature sensor in an industrial environment. The temperature sensor may have access to 100 units of available computing resources. Therefore, the portion of the inference model obtained by the temperature sensor may require 90 units of computing resources (and/or any number of computing resources below the available 100 units).

In an embodiment, a data processing system (e.g., data processing system 100A) may obtain the portion of the inference model from inference model manager 102. Alternatively, the data processing system may obtain the portion of the inference model from another entity (e.g., another inference model manager, another data processing system, etc.) throughout the distributed environment. The data processing system may also obtain instructions regarding the timely execution of the inference model (e.g., an execution plan).

At operation 310, a processing result is obtained using the portion of the inference model. Data processing system 100A may obtain a processing result by feeding input data into the portion of the inference model hosted by the data processing system 100A. The input data may be live (e.g., unprocessed) data and/or may be a partial processing result obtained as the output of a second portion of the inference model hosted by a second data processing system (e.g., data processing system 100B).

In an embodiment, the processing result may be a set of values, parameters, and/or other data usable by a third data processing system (e.g., data processing system 100C) as input data for a third portion of the inference model. Alternatively, the processing result may be output data usable by a downstream consumer of the inferences generated by the inference model.

At operation 311, the processing result is provided to a user of the processing result. As previously mentioned, the user of the processing result may be a downstream consumer, another data processing system, and/or another entity.

The method may end following operation 311.

To further clarify embodiments disclosed herein, an example implementation in accordance with an embodiment is shown in FIGS. 4A-4J. These figures show diagrams illustrating an inference model execution process to support a manufacturing environment in accordance with an embodiment. FIGS. 4A-4J may show examples of processes for obtaining inferences using an inference model across multiple data processing systems to drive the manufacturing environment in accordance with an embodiment.

Figure 4A:
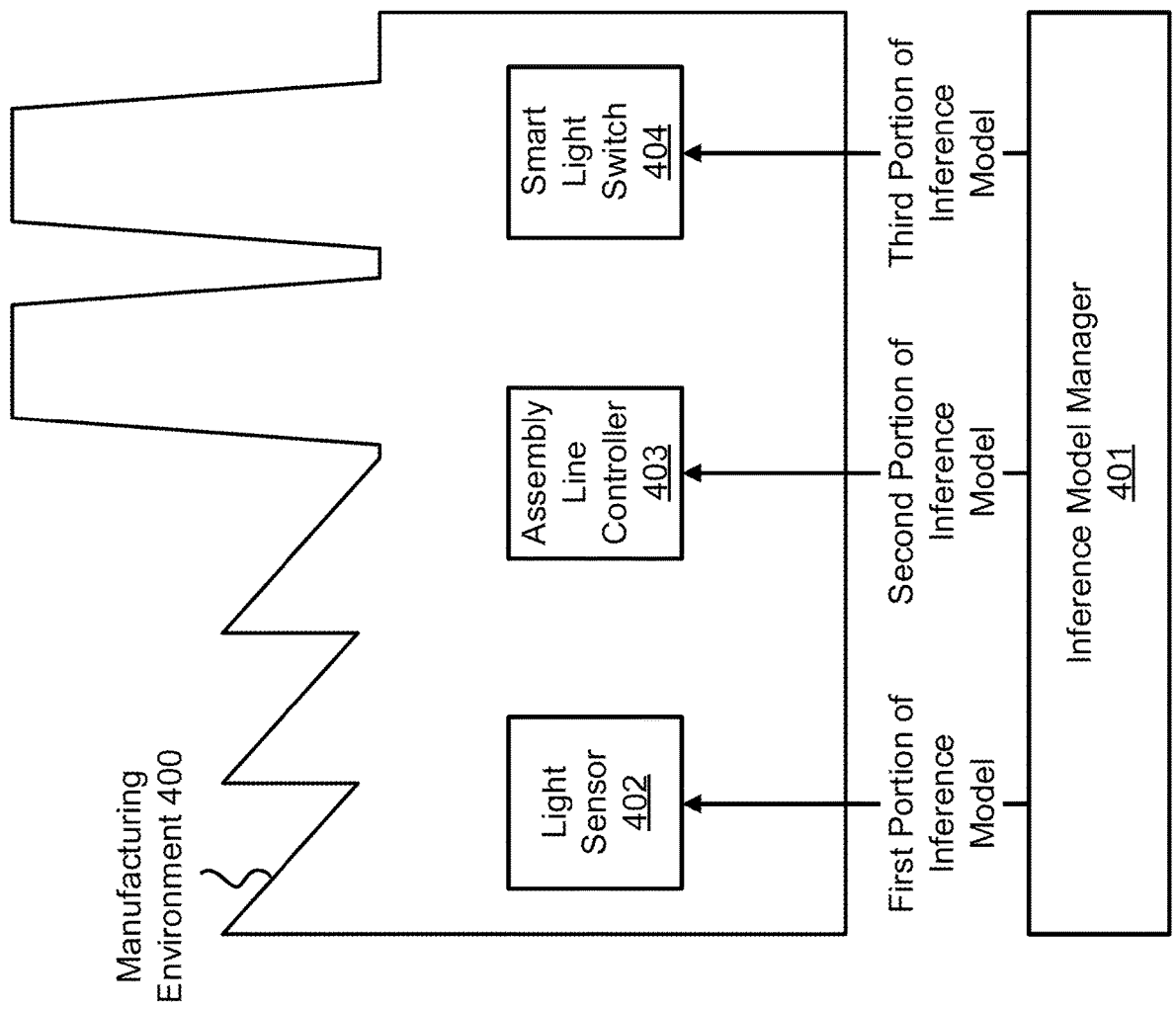
FIGS. 4A-4B show diagrams illustrating a method of executing an inference model across multiple data processing systems over time in an industrial environment in accordance with an embodiment.

Turning to FIG. 4A, consider a scenario in which inferences may be used to make quality control decisions (e.g., to retain or discard) regarding a product manufactured on an assembly line in manufacturing environment 400. Rather than adding a data processing system to the manufacturing environment 400 in order to host and execute (e.g., operate) the inference model, inference model manager 401 may distribute portions of an inference model to data processing systems with available computing resources throughout manufacturing environment 400. By doing so, existing data processing systems (e.g., light sensor 402, assembly line controller 403, and smart light switch 404) may collectively host and operate the inference model to obtain inferences usable by a robotic arm to determine whether to retain or discard products on the assembly line.

In order to distribute portions of an inference model, inference model manager 401 may obtain portions of the inference model based on characteristics of the light sensor 402, assembly line controller 403, and smart light switch 404 in order to conserve computing resource expenditure throughout manufacturing environment 400. In addition, the portions of the inference model may be obtained based on characteristics of the inference model (e.g., data dependencies of neurons in a neural network inference model) in order to reduce the required transmissions between data processing systems during execution of the inference model. Refer to FIG. 3B for additional details regarding obtaining portions of the inference model.

Inference model manager 102 may distribute a first portion of the inference model to light sensor 402, a second portion of the inference model to assembly line controller 403, and a third portion of the inference model to smart light switch 404. Collectively, the light sensor 402, assembly line controller 403, and smart light switch 404 may generate an inference model result usable by a downstream consumer (e.g., a robotic arm) as described below.

Figure 4B:
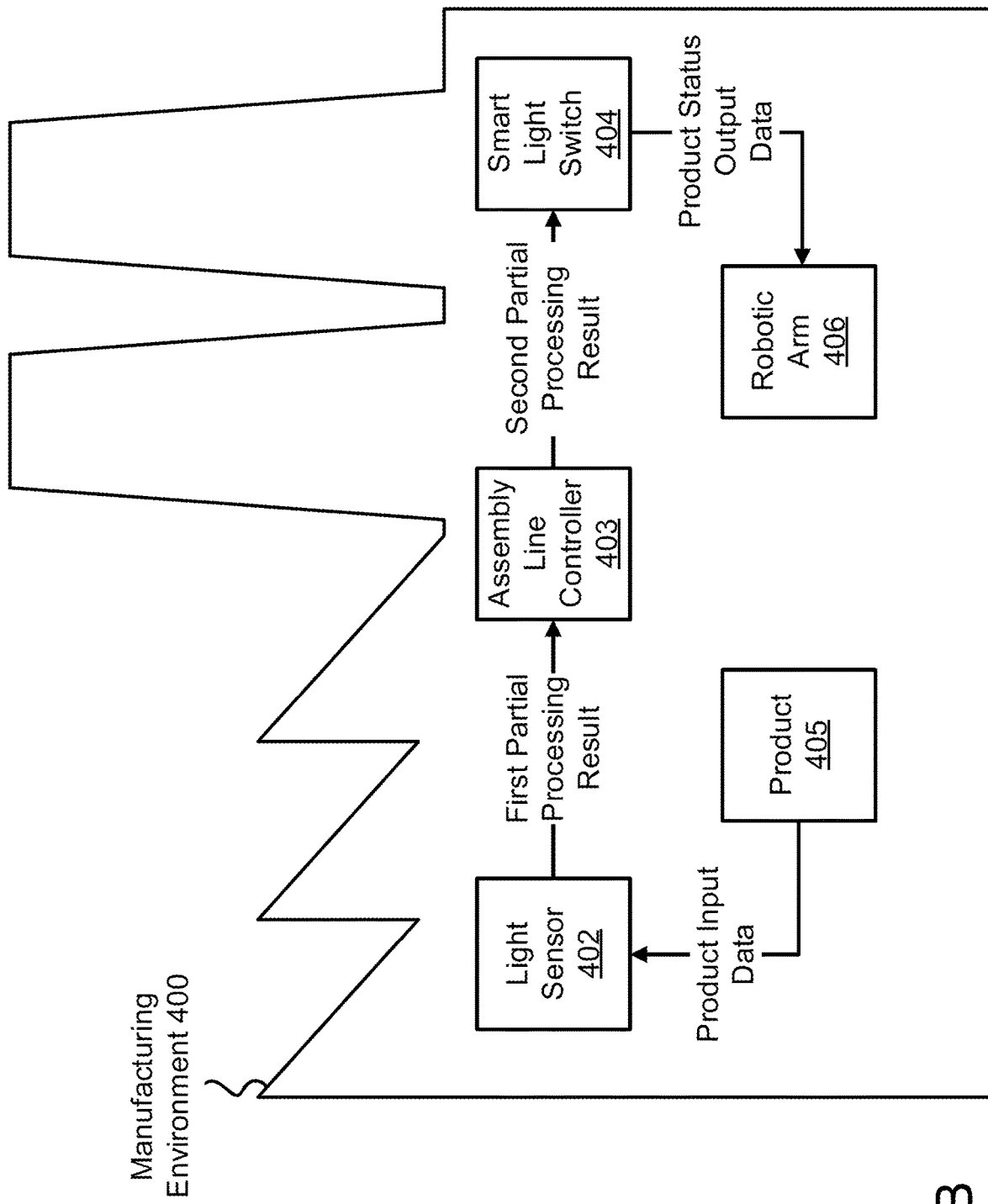

Turning to FIG. 4B, a product 405 may be built on an assembly line in the manufacturing environment 400. In order to make a quality control decision regarding the product, product input data may be collected and transmitted to the light sensor 402. The product input data may include any data indicating the operability and specifications of the product 405. Light sensor 402 may host a portion of an inference model and may feed the product input data into the portion of the inference model to obtain a first partial processing result. Input data may enter the system via other data processing systems throughout manufacturing environment 400 as needed to execute the inference model (not shown).

The light sensor 402 may transmit the first partial processing result to the assembly line controller over a communication system (e.g., communication system 101). Assembly line controller 403 may host a second portion of an inference model and may feed the first partial processing result into the second portion of the inference model to obtain a second partial processing result. Alternatively, assembly line controller 403 may obtain intermediate output data and a data processing system in manufacturing environment 400 may use the intermediate output data to perform a task, make a decision, and/or perform an action set (not shown).

Assembly line controller 403 may transmit the second partial processing result to the smart light switch 404 over a communication system (e.g., communication system 101). Smart light switch 404 may host a third portion of an inference model and may feed the second partial processing result into the third portion of the inference model to obtain product status output data. The product status output data may include the one or more inferences generated by the portions of the inference model. The product status output data may indicate whether the product 405 may pass a quality control check and may include instructions for robotic arm 406. Smart light switch 404 may transmit the product status output data to the robotic arm 406 and, therefore, robotic arm 406 may obtain instructions regarding whether to retain or discard product 405. For example, the product status output data may indicate that the product 405 does meet the quality control standards and the robotic arm may retain the product 405.

Figure 4C:
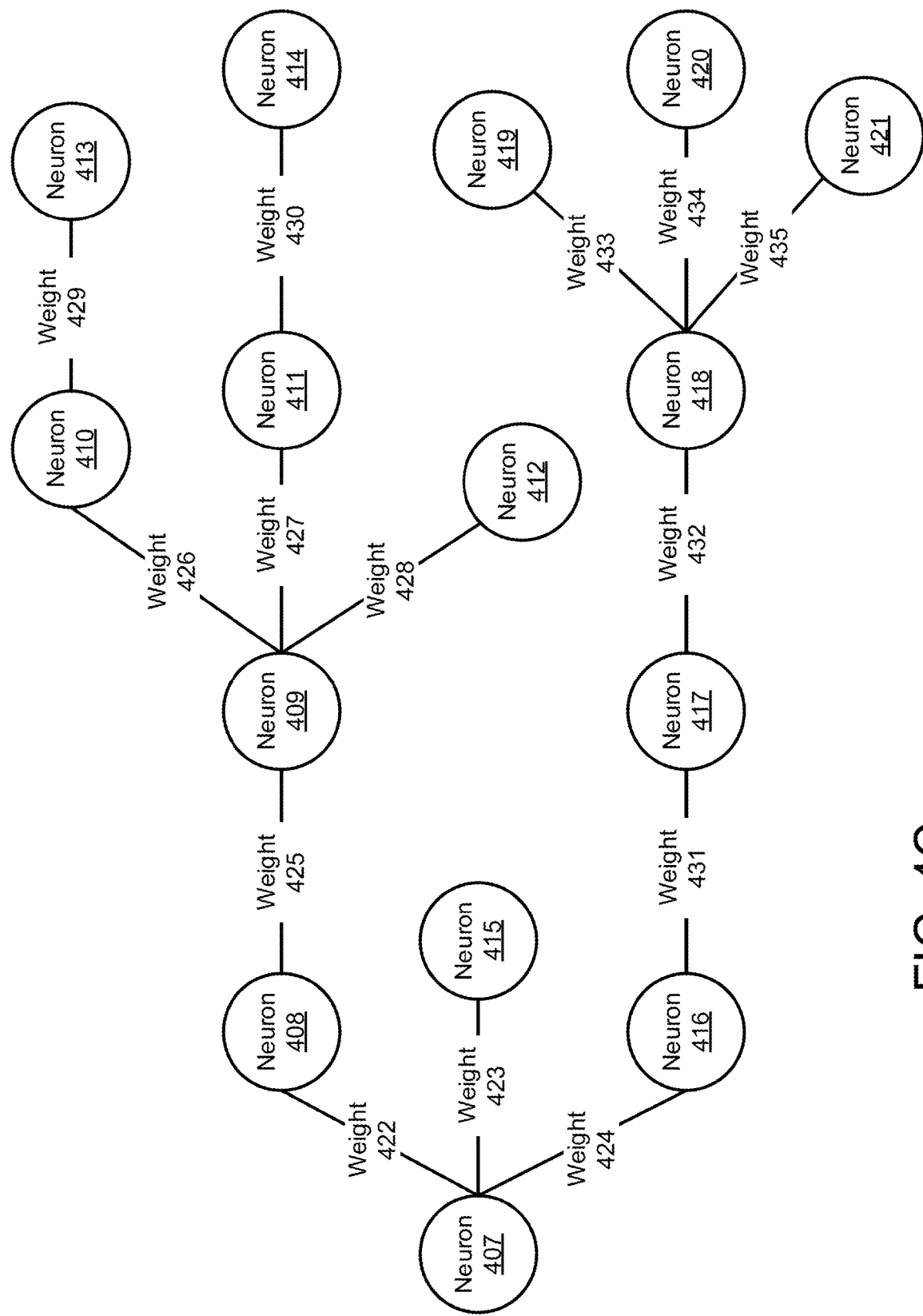
FIGS. 4C-4J show diagrams illustrating an example neural network and corresponding bipartite graph in accordance with an embodiment.

Turning to FIG. 4C, an example neural network inference model is shown. The neural network inference model may include neurons 407-421. Neurons 407-421 may belong to any layer of the neural network inference model. While shown as including fifteen neurons, the neural network inference model may include more, less, and/or different neurons than those described with respect to FIG. 4C. In addition, while each neuron is shown in FIG. 4C as receiving input from one other neuron, neurons in a neural network inference model may receive input from any number of other neurons without departing from embodiments disclosed herein. Relationships between the neurons 407-421 may be represented by lines connecting the neurons. In addition, the relationships may include any number of data dependencies (e.g., parameters such as weights, biases, etc.) to characterize the relationship between two neurons. For example, each relationship may include a weight (e.g., weights 422-435) and the magnitude of the weights may represent intermediary computations between neurons. For example, neuron 407 may be connected to neuron 408 via a relationship with a weight 422. The neurons 407-421 and the weights 422-435 may be utilized to obtain a bipartite graph as described below.

Figure 4D:
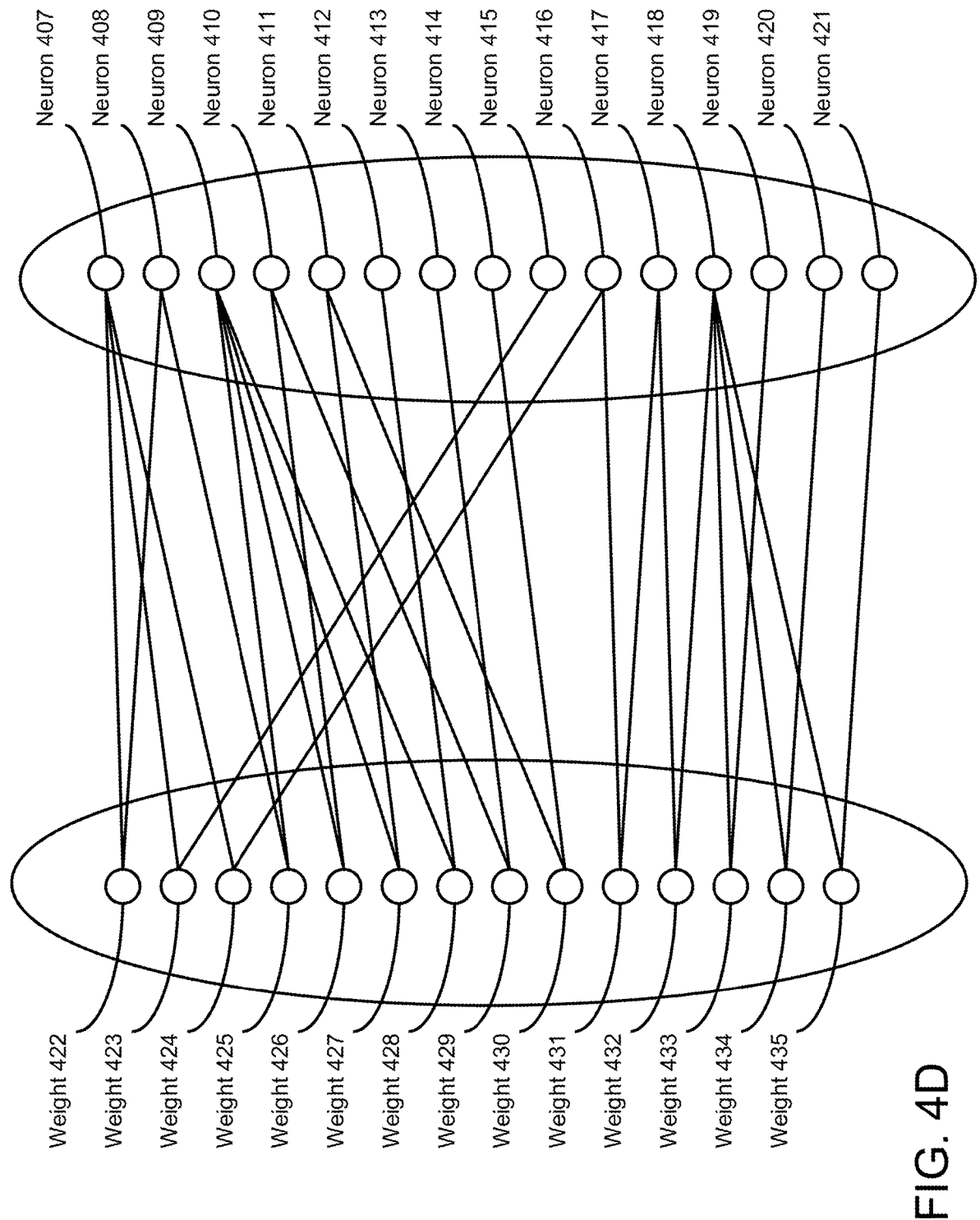

Turning to FIG. 4D, the neurons 407-421 and the weights 422-435 may be represented as a bipartite graph. While shown in FIG. 4D as including only weights, a bipartite graph may include representations of any number of other and/or additional data dependencies (e.g., biases). A first set of elements (e.g., nodes) of the bipartite graph may include weights 422-435 represented on the left side of FIG. 4D. A second set of elements of the bipartite graph may include neurons 407-421 represented on the right side of FIG. 4D. The first set of elements and the second set of elements may be connected by edges between the elements, the edges representing communications required in order to execute the inference model (assuming each neuron is hosted by a separate data processing system). For example, neuron 407 may be connected to neuron 408 via a relationship with a weight 422. Therefore, a first edge may connect neuron 407 to weight 422 and a second edge may connect weight 422 to neuron 408 to indicate this relationship.

Portions of the bipartite graph may be obtained through partitioning in order to identify corresponding portions of the inference model. Portions of the bipartite graph may be obtained in order to reduce a quantity of edges between the portions of the bipartite graph and, therefore, reduce a quantity of communications required between data processing systems in order to execute the inference model. The portions of the inference model may be distributed to any number of data processing systems throughout a distributed environment as described with respect to FIG. 3A. In order to obtain portions of the inference model, portions of the bipartite graph may be obtained as described below.

Figure 4E:
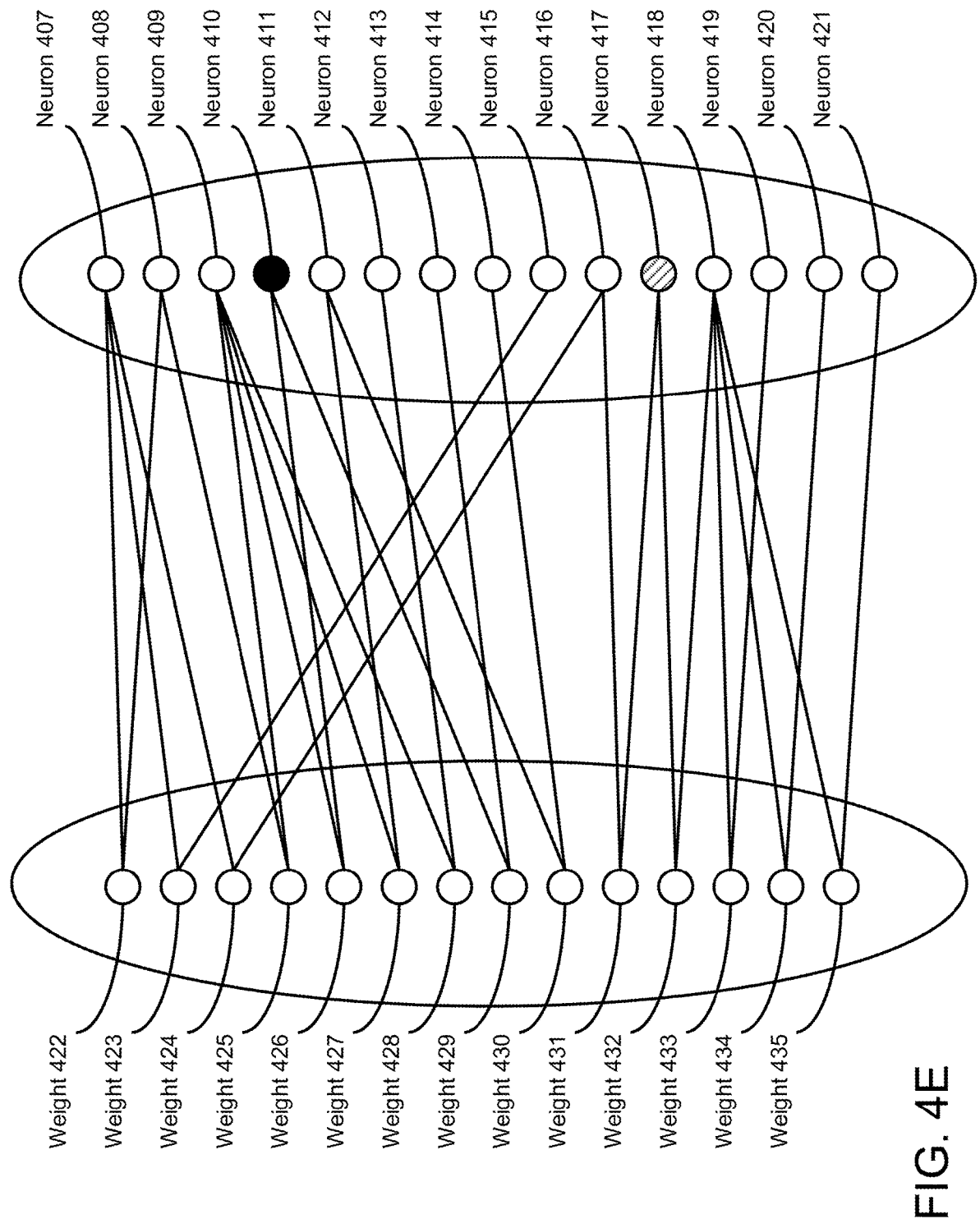

Turning to FIG. 4E, two initial portions of the bipartite graph may be obtained by randomly assigning one neuron of the neural network inference model to each initial portion of the bipartite graph. For example, neuron 410 may be assigned to a first initial portion (represented as the filled-in circle) and neuron 417 may be assigned to a second portion (represented by the striped circle).

Figure 4F:
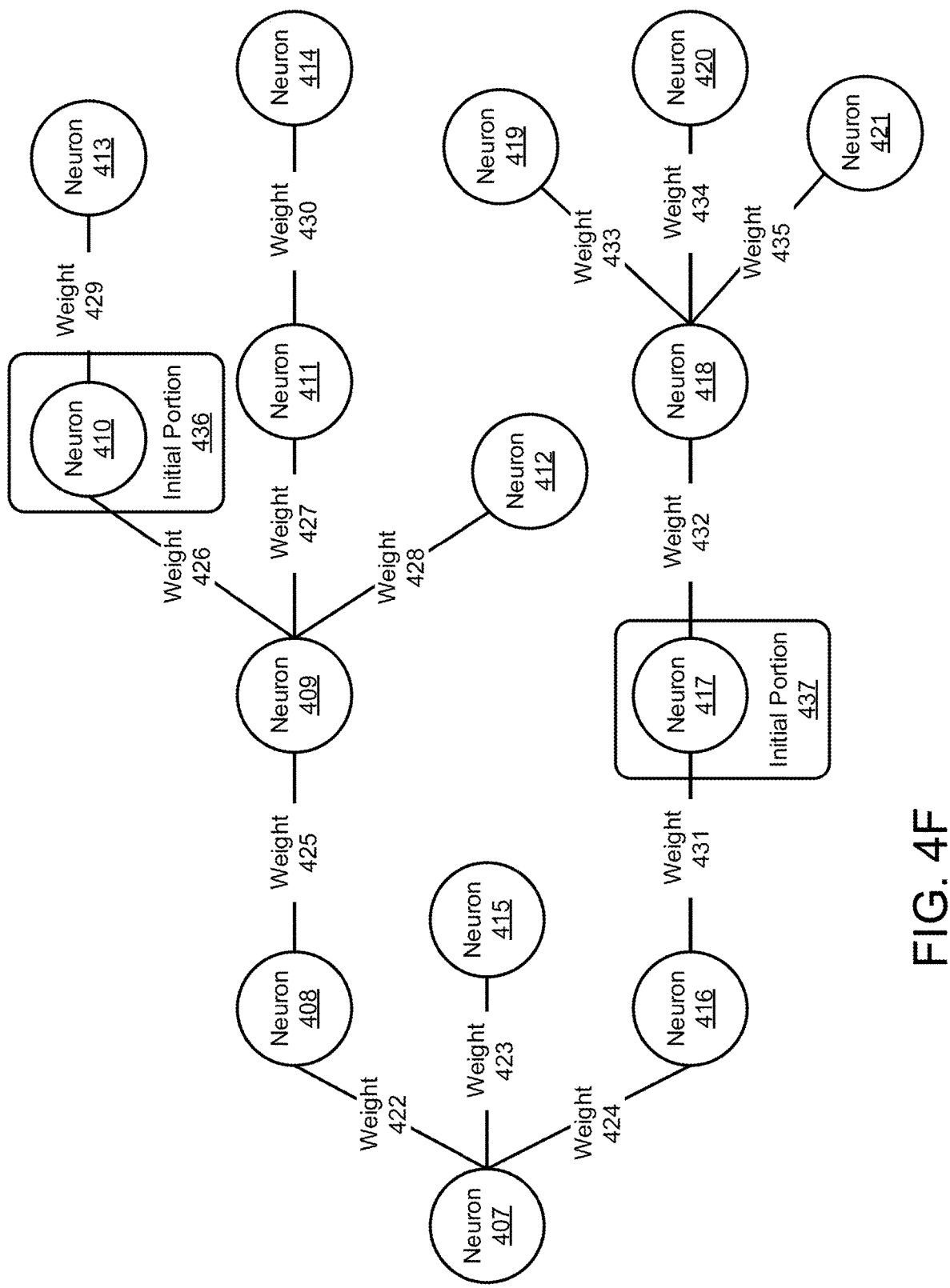

Turning to FIG. 4F, the first initial portion (e.g., initial portion 436) and the second initial portion (e.g., initial portion 437) are represented superimposed on the neural network inference model. Initial portion 436 and initial portion 437 may expand as described below.

Figure 4G:
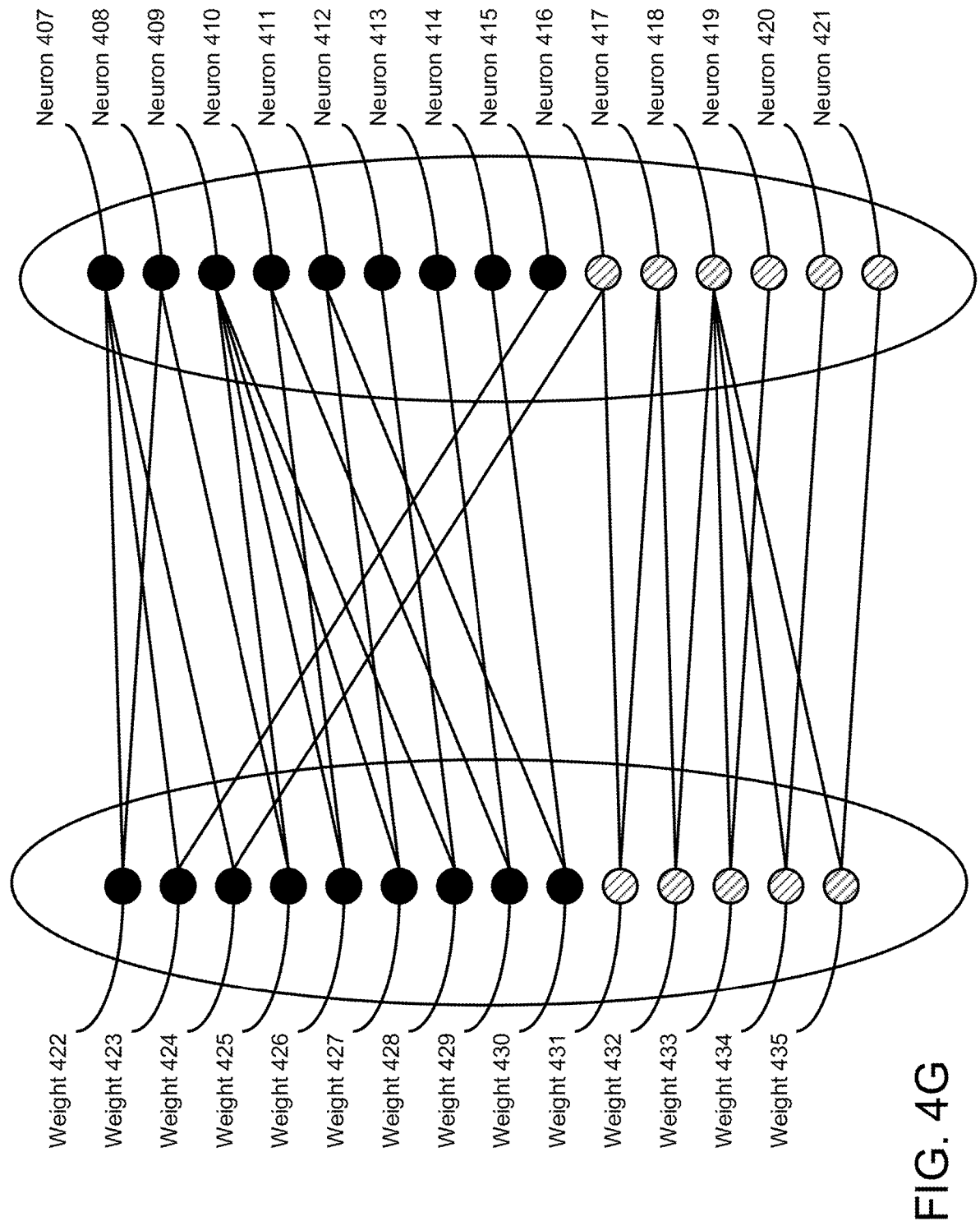

Turning to FIG. 4G, initial portion 436 and initial portion 437 may expand until each neuron of the inference model belongs to either initial portion 436 or initial portion 437. Nodes of the bipartite graph may be added to the initial portions 436 and 437 via a breadth-first search for each of the portions. The breadth-first search for one of the initial portions may locate an unclaimed neighboring node to any of the nodes in the bipartite graph and add the neighboring node to the initial portion to obtain a revised portion. The neighboring node may have a data dependency with respect to the last added node. For example, neuron 410 in initial portion 436 may locate and add neuron 413 via a breadth-first search, as neuron 410 and neuron 413 may be connected via a relationship with weight 429. In addition, initial portion 436 may locate and add neuron 409 via a breadth-first search, as neuron 409 and neuron 410 may be connected via a relationship with weight 426. This process may continue until all nodes of the bipartite graph may be assigned to one of the revised portions.

Figure 4H:
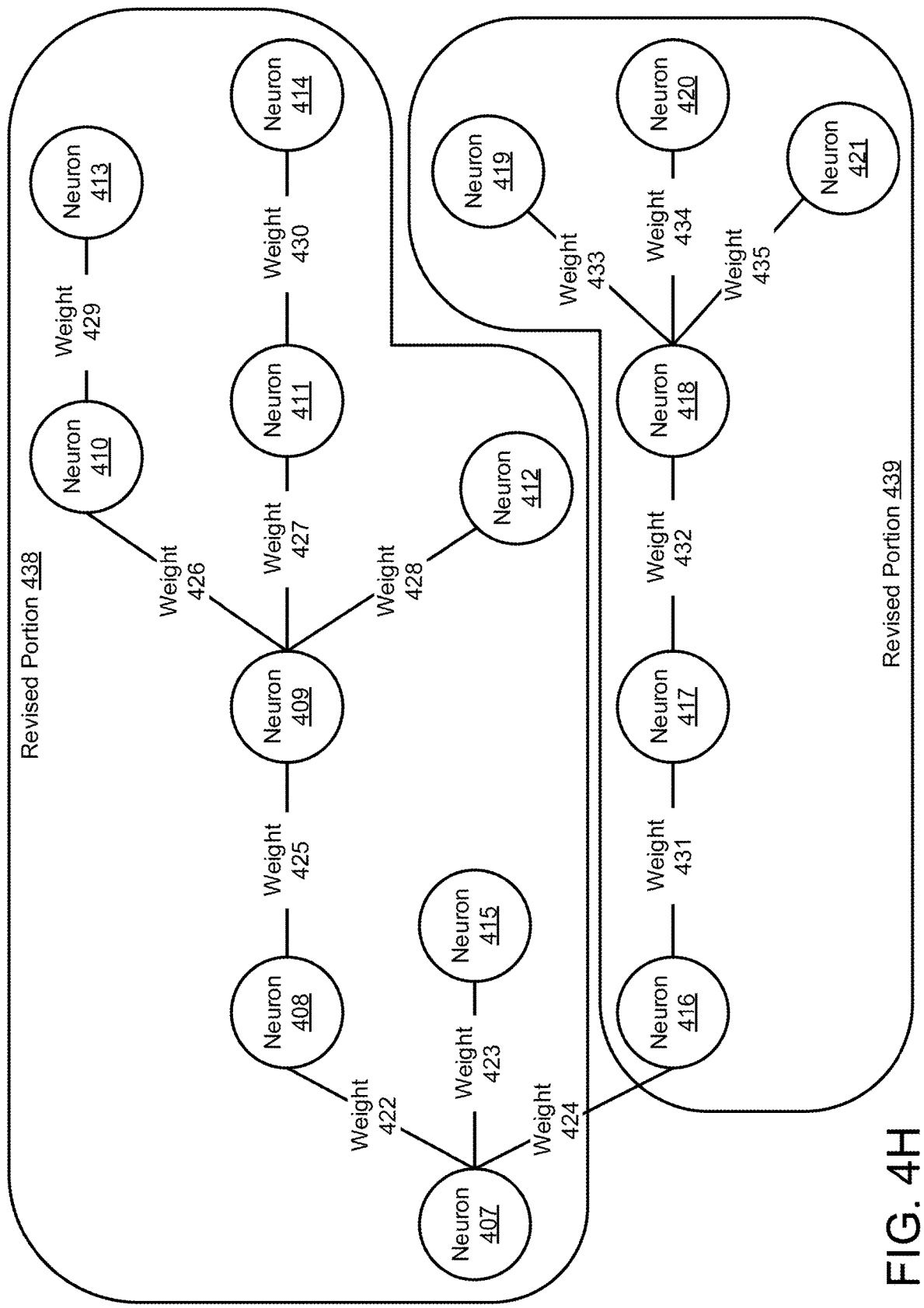

Turning to FIG. 4H, the revised portions (e.g., revised portion 438 and revised portion 439) are represented superimposed on the neural network inference model. The neurons and weights included in revised portion 438 may require 500 units of storage resources and execution of the portion of the neurons may require 300 units of processing resources. However, a first data processing system (e.g., a light sensor) may have 300 units of available processing resources but only 450 units of available storage resources. Therefore, revised portion 438 may be unstable for distribution to the light sensor.

The neurons and weights included in revised portion 439 may require 300 units of storage resources and execution of the portion of the neurons may require 300 units of processing resources. A second data processing system (e.g., an assembly line controller) may have 300 units of available processing resources and 400 units of available storage resources. Therefore, revised portion 439 may be within the computing resources available to the assembly line controller (e.g., may be stable).

Prior to assigning the portions of the inference model based on the portions of the bipartite graph, further optimization of the revised portions may occur in order to increase stability of the revised portions. Therefore, nodes may be removed from revised portion 438 and the removed nodes may be added to revised portion 439 as described below.

Figure 4I:
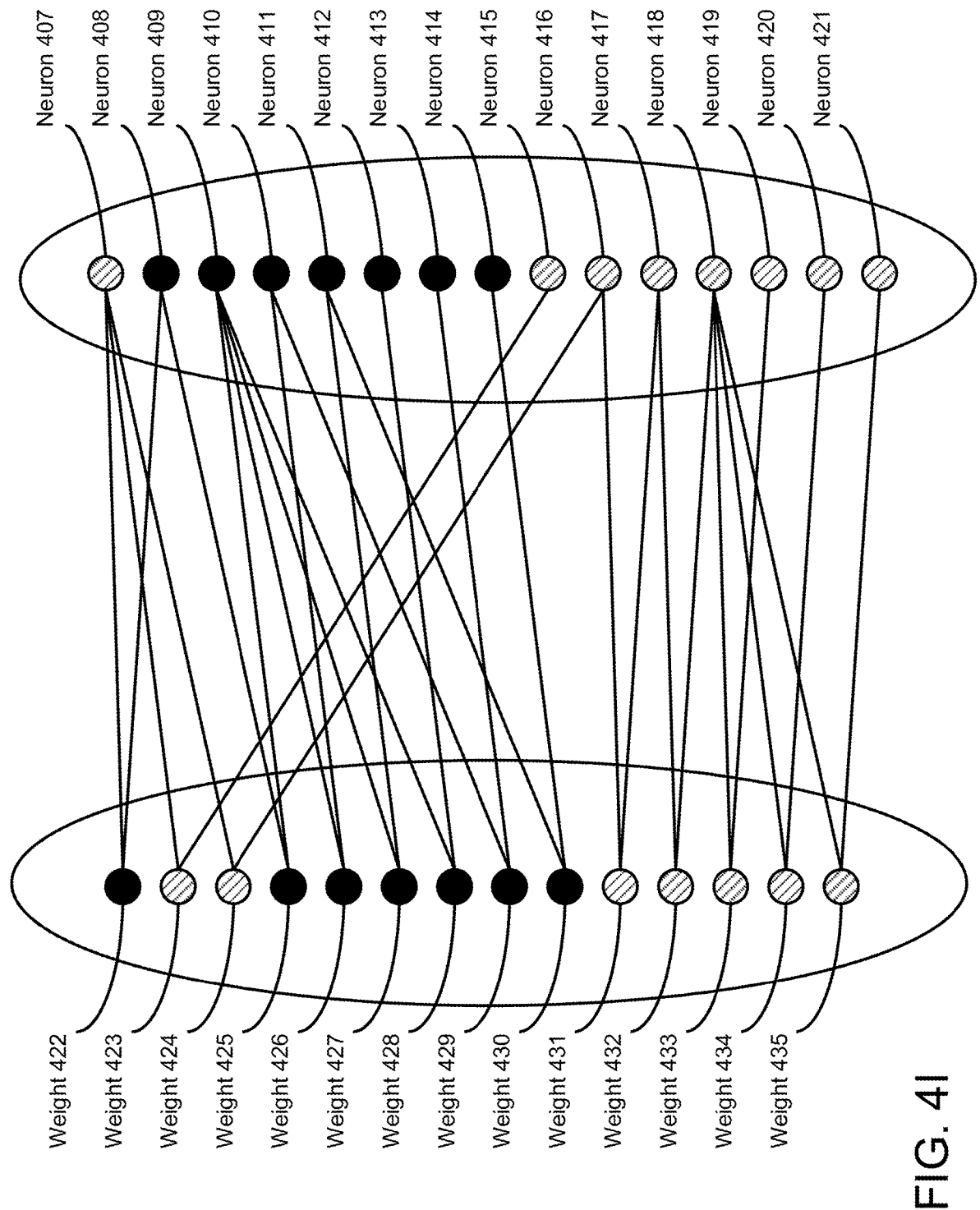

Turning to FIG. 4I, a competitive optimization process may occur in order to increase stability of the revised portions. For example, revised portion 439 may attempt to capture neuron 407, neuron 415, weight 423 and weight 424 from revised portion 438. By doing so, the storage resource requirements of revised portion 438 may be reduced to 450 units of storage resources, rendering revised portion 438 stable for distribution to the light sensor. Revised portion 439 may now require 350 units of storage resources and 300 units of processing resources. Therefore, revised portion 438 and revised portion 439 may be considered stable for distribution to their corresponding data processing systems. This optimization process may continue in order to further increase stability of the revised portions of the bipartite graph and/or to reduce the edges between the revised portions of the bipartite graph (not shown). By reducing the edges between the revised portions, required communications may be reduced between data processing systems during execution of the inference model.

Figure 4J:
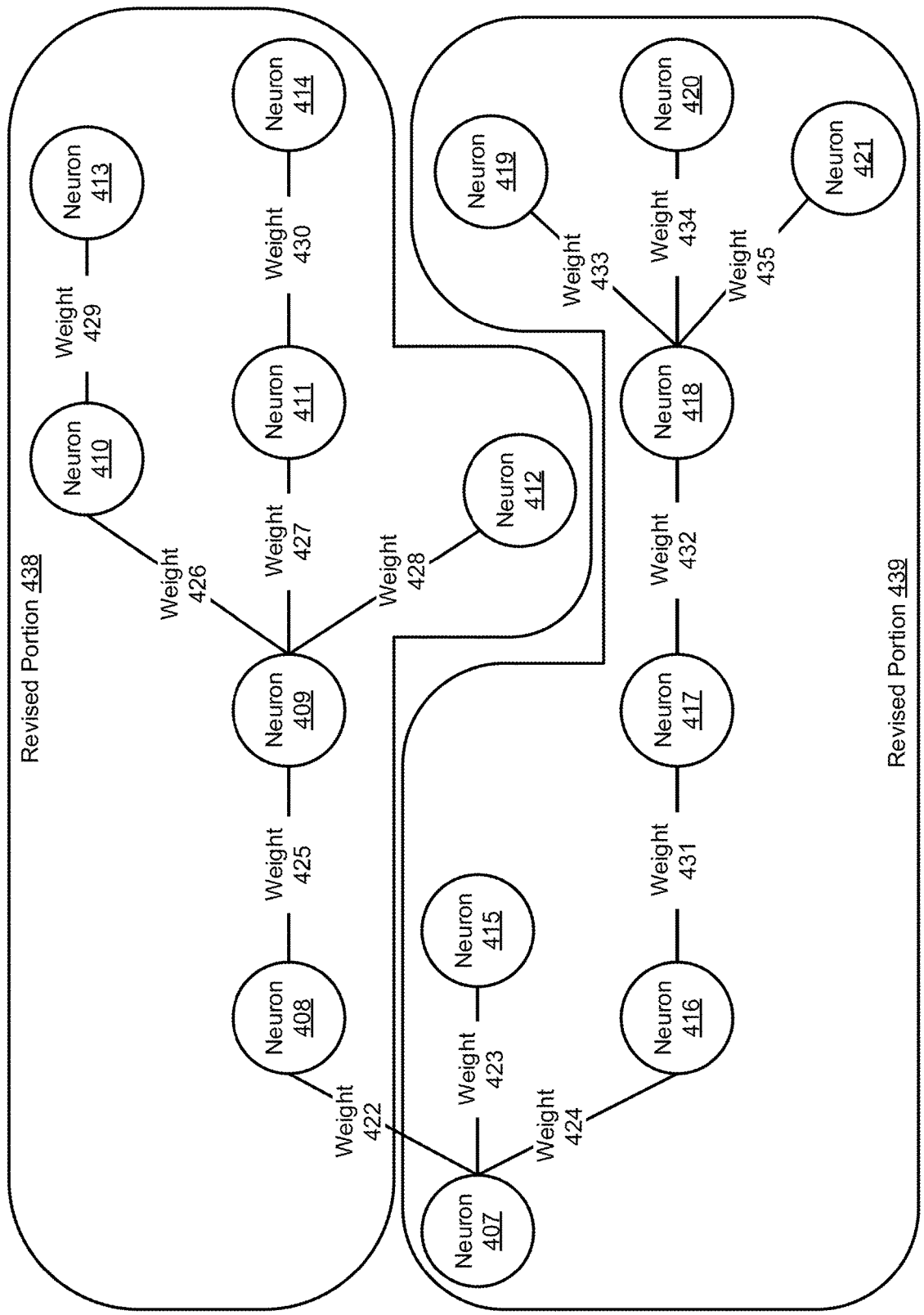

Turning to FIG. 4J, the revised portions of the bipartite graph may be utilized to obtain portions of the inference model. A first portion of the inference model may include neurons 408-414, weight 422, and weights 426-430. A second portion of the inference model may include neuron 407, neurons 415-421, weights 423-424, and weights 431-435. The first portion of the inference model may be distributed to the light sensor and the second portion of the inference model may be distributed to the assembly line controller for implementation in an industrial environment. Therefore, the light sensor and assembly line controller may collectively generate inferences usable by a downstream consumer while conserving computing resources and reducing communication bandwidth consumption throughout the distributed environment.

As previously mentioned, FIGS. 4A-4J show an example implementation in accordance with an embodiment. Other embodiments may include additional, fewer, and/or different components and/or interactions between components without departing from embodiments disclosed herein.

Figure 5:
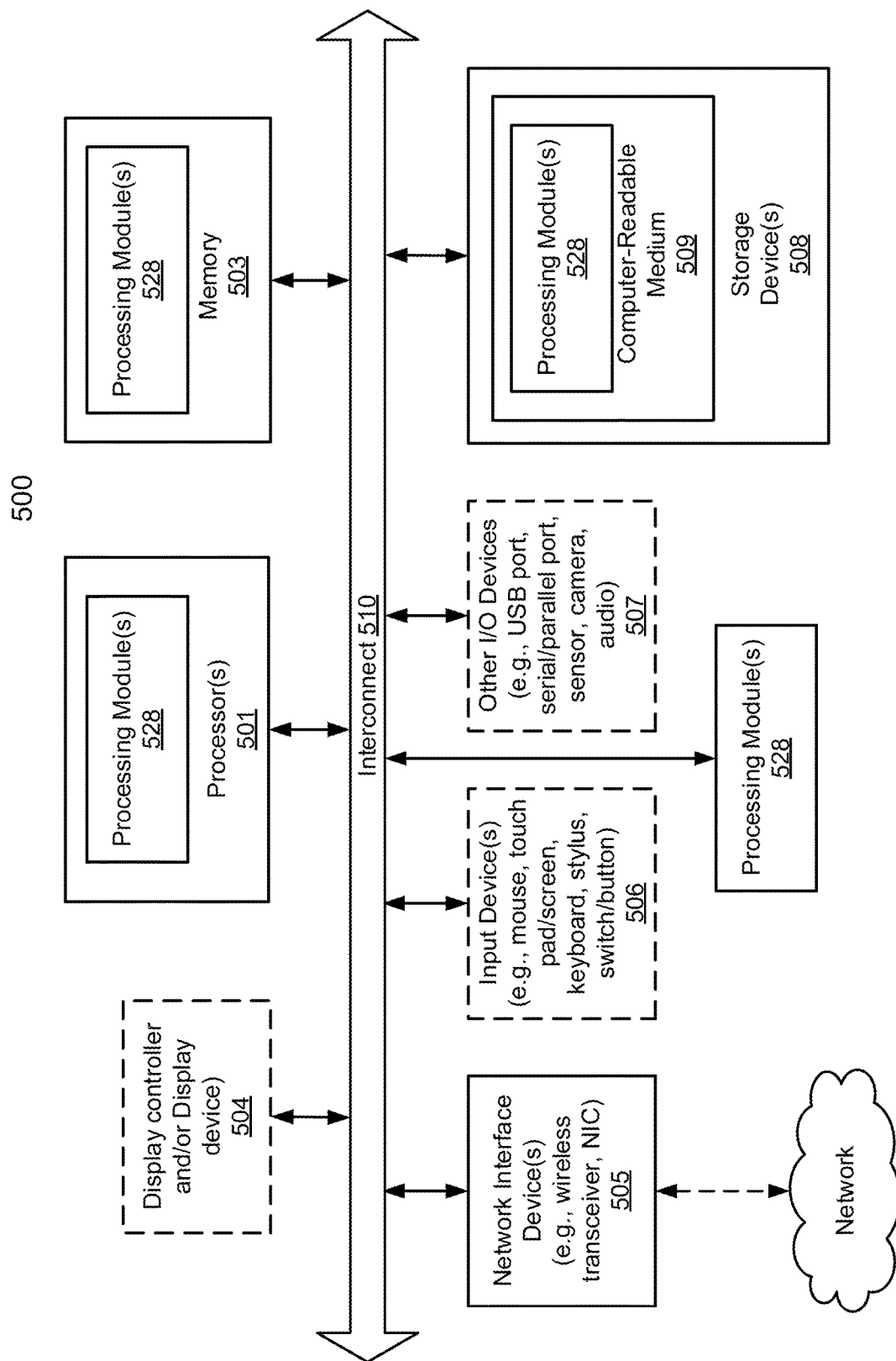
FIG. 5 shows a block diagram illustrating a data processing system in accordance with an embodiment.

Any of the components illustrated in FIGS. 1-4J may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows© operating system from Microsoft*, Mac OS©/iOS© from Apple, Android© from Google©, Linux©, Unix©, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for executing an inference model across multiple data processing systems that each individually have insufficient computing resources to complete timely execution of the inference model, the method comprising:
   identifying available computing resources of each of the data processing systems;
   dividing the inference models into portions based on:
      characteristics of units of the inference model that indicate data dependencies between the units of the inference model, and
      an optimization process that groups the units into the portions of the inference model based on a likelihood of potential groups of the units exceeding the available computing resources of corresponding data processing systems;
   distributing the portions of the inference model to the data processing systems; and
   executing the inference model using the portions of the inference model distributed to the data processing systems to obtain an inference model result.

2. The method of claim 1, wherein the units of the inference model are neurons of a trained neural network.

3. The method of claim 2, wherein the data dependencies between the units of the inference model comprise weights for the corresponding neurons.

4. The method of claim 1, further comprising:
   obtaining a bipartite graph representation of the inference model.

5. The method of claim 4, wherein a first group of nodes of the bipartite graph representation correspond to neurons of a trained neural network and a second group of the nodes of the bipartite graph representation correspond to the data dependencies between the neurons of the trained neural network.

6. The method of claim 5, where performing the optimization process comprises:
   obtaining initial portions of the bipartite graph, with each of the initial portions comprising a node of the bipartite graph corresponding to a unit of the trained neural network;
   optimizing the initial portions of the bipartite graph to obtain revised portions of the bipartite graph; and
   adding units of the trained neural network to the portions of the inference model based on the revised portions of the bipartite graph.

7. The method of claim 6, wherein the initial portions of the bipartite graph are obtained by randomly assigning a node from the bipartite graph to each respective portion of the portions of the bipartite graph.

8. The method of claim 7, where optimizing the initial portions of the bipartite graph comprises:
   for a portion of the portions of the bipartite graph:
      performing a breadth-first search to identify a neighboring node of the bipartite graph with respect to a last added node of the portion;
      adding the neighboring node to the portion to obtain a revised portion;
      making a determination regarding whether the revised portion is unstable;
      in an instance where the determination indicates that the portion is unstable:
         dividing the revised portion into two portions to obtain a set of stable portions; and
      in an instance where the determination indicates that the portion is stable:
         retaining the revised portion to obtain the set of stable portions.

9. The method of claim 8, where optimizing the initial portions of the bipartite graph further comprises:
   revising the set of stable portions based on a competitive process that removes nodes from portions of the set of stable portions that are closer to a stability limit and adding the removed nodes to other portions of the set of stable portions that are further away from the stability limit.

10. The method of claim 8, wherein the neighboring node has a data dependency with respect to the last added node.

11. A non-transitory machine-readable medium having instructions stored therein, which when executed by a processor, cause the processor to perform operations for executing an inference model across multiple data processing systems that each individually have insufficient computing resources to complete timely execution of the inference model, the operations comprising:

identifying available computing resources of each of the data processing systems;

dividing the inference models into portions based on:

characteristics of units of the inference model that indicate data dependencies between the units of the inference model, and an optimization process that groups the units into the portions of the inference model based on a likelihood of potential groups of the units exceeding the available computing resources of corresponding data processing systems;

distributing the portions of the inference model to the data processing systems; and executing the inference model using the portions of the inference model distributed to the data processing systems to obtain an inference model result.

12. The non-transitory machine-readable medium of claim 11, wherein the units of the inference model are neurons of a trained neural network.

13. The non-transitory machine-readable medium of claim 12, wherein the data dependencies between the units of the inference model comprise weights for the corresponding neurons.

14. The non-transitory machine-readable medium of claim 11, wherein the operations further comprise:

obtaining a bipartite graph representation of the inference model.

15. The non-transitory machine-readable medium of claim 14, wherein a first group of nodes of the bipartite graph representation correspond to neurons of a trained neural network and a second group of the nodes of the bipartite graph representation correspond to the data dependencies between the neurons of the trained neural network.

16. A data processing system, comprising:

a processor; and a memory coupled to the processor to store instructions, which when executed by the processor, cause the processor to perform operations for executing an inference model across multiple data processing systems that each individually have insufficient computing resources to complete timely execution of the inference model, the operations comprising:

identifying available computing resources of each of the data processing systems;

dividing the inference models into portions based on:

characteristics of units of the inference model that indicate data dependencies between the units of the inference model, and an optimization process that groups the units into the portions of the inference model based on a likelihood of potential groups of the units exceeding the available computing resources of corresponding data processing systems;

distributing the portions of the inference model to the data processing systems; and executing the inference model using the portions of the inference model distributed to the data processing systems to obtain an inference model result.

17. The data processing system of claim 16, wherein the units of the inference model are neurons of a trained neural network.

18. The data processing system of claim 17, wherein the data dependencies between the units of the inference model comprise weights for the corresponding neurons.

19. The data processing system of claim 16, wherein the operations further comprise:

obtaining a bipartite graph representation of the inference model.

20. The data processing system of claim 19, wherein a first group of nodes of the bipartite graph representation correspond to neurons of a trained neural network and a second group of the nodes of the bipartite graph representation correspond to the data dependencies between the neurons of the trained neural network.

\* \* \* \* \*